(12) United States Patent
Wang et al.

(10) Patent No.: US 12,072,080 B2
(45) Date of Patent: Aug. 27, 2024

(54) LAMP, LAMP SYSTEM, METHOD FOR ASSEMBLING LAMP SYSTEM, AND METHOD FOR DISASSEMBLING LAMP SYSTEM

(71) Applicant: Radiant Opto-Electronics Corporation, Kaohsiung (TW)

(72) Inventors: Pin-Tsung Wang, Kaohsiung (TW); Chih-Hung Ju, Kaohsiung (TW); Chung-Kuang Chen, Kaohsiung (TW); Ming-Huang Yang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 114 days.

(21) Appl. No.: 17/930,070

(22) Filed: Sep. 7, 2022

(65) Prior Publication Data
US 2023/0101869 A1    Mar. 30, 2023

Related U.S. Application Data

(63) Continuation of application No. PCT/CN2021/110224, filed on Aug. 3, 2021.

(51) Int. Cl.
*F21V 21/005* (2006.01)
*F21V 17/00* (2006.01)
*F21V 17/10* (2006.01)
*F21V 21/02* (2006.01)

(52) U.S. Cl.
CPC .......... *F21V 21/005* (2013.01); *F21V 17/002* (2013.01); *F21V 17/10* (2013.01); *F21V 21/02* (2013.01); *F21V 2200/20* (2015.01)

(58) Field of Classification Search
CPC ........ F21V 21/005; F21V 21/02; F21V 17/10; F21V 17/002
See application file for complete search history.

(56) References Cited

U.S. PATENT DOCUMENTS

| 9,470,375 B2 * | 10/2016 | Van Es ..................... F21S 4/28 |
| 2006/0120104 A1 | 6/2006 | Iwasa et al. |
| 2012/0020109 A1 * | 1/2012 | Kim ..................... G02B 6/0078 362/85 |

(Continued)

FOREIGN PATENT DOCUMENTS

| CN | 104641166 A | 5/2015 |
| CN | 204986644 U | 1/2016 |

(Continued)

*Primary Examiner* — Leah Simone Macchiarolo
(74) *Attorney, Agent, or Firm* — CKC & Partners Co., LLC (57) ABSTRACT

A lamp, a lamp system, a method for assembling lamp system, and a method for disassembling lamp system are described. The lamp includes a frame, a light guide plate, at least one light source and a connecting mechanism. The frame includes two side covers opposite to each other, and an accommodating space is formed between the side covers. The light guide plate is disposed in the accommodating space. The light source is disposed in at least one of the side covers and is disposed adjacent to a light incident surface of the light guide plate. The connecting mechanism is disposed in the frame. The connecting mechanism includes an engaging member and an adjusting member. The engaging member is slidably disposed in an inner space of one of the side covers.

12 Claims, 13 Drawing Sheets

(56) References Cited

U.S. PATENT DOCUMENTS

| | | | | |
|---|---|---|---|---|
| 2012/0257383 A1* | 10/2012 | Zhang | .................. | F21V 5/02 |
| | | | | 362/327 |
| 2015/0377464 A1* | 12/2015 | Ju | .................. | G02B 6/0091 |
| | | | | 362/613 |
| 2020/0116342 A1* | 4/2020 | Ju | .................. | G02B 6/0081 |

FOREIGN PATENT DOCUMENTS

| | | | |
|---|---|---|---|
| CN | 208170097 U | 11/2018 | |
| CN | 212456680 U | 2/2021 | |
| TW | M451475 U | 4/2013 | |
| TW | 201537110 A | 10/2015 | |
| TW | 202041811 A | 11/2020 | |
| WO | 2017023059 A1 | 2/2017 | |
| WO | 2019037080 A1 | 2/2019 | |
| WO | 2020073318 A1 | 4/2020 | |
| WO | WO-2020127690 A1 * | 6/2020 | .............. F16B 7/182 |

* cited by examiner

LAMP, LAMP SYSTEM, METHOD FOR ASSEMBLING LAMP SYSTEM, AND METHOD FOR DISASSEMBLING LAMP SYSTEM

RELATED APPLICATIONS

This application is a continuation application of International Application No. PCT/CN2021/110224 filed on Aug. 3, 2021, which is incorporated herein by reference.

BACKGROUND

Field of Invention

The present disclosure relates to a light-emitting device, and more particularly to a lamp, a lamp system, a method for assembling lamp system, and a method for disassembling lamp system.

Description of Related Art

In respond to demand of market, the design of lamps is more and more various. There is a pendent transparent lamp being able to generate light and have a nice appearance simultaneously.

However, pendent lamps are generally connected to electric sources via cables. When plural lamps are needed to be connected in series, an unconcealed cable is not only complicate to assemble or disassemble, but also high cost and further leads to a chaotic visual effect of space. Furthermore, when the plural transparent lamps are connected in circular series, the last lamp is hard to be connected to the previous lamp and the next lamp and leads to higher difficulty of assembling process and disassembling process in a limited space.

SUMMARY

Accordingly, an objective of the present disclosure is to provide a lamp, through a frame design of the lamp, assembling and disassembling can be swiftly achieved.

According to the aforementioned objectives of the present disclosure, a lamp is provided. The lamp includes a frame, a light guide plate, at least one light source and a connecting mechanism. The frame includes two relative side coves, and the side covers enclose an accommodating space collectively. The light guide plate is disposed in the accommodating space. The light source is disposed in at least one of the side covers, and the light source is disposed near an incident surface of the light guide plate. The connecting mechanism is disposed in the frame, and the connecting mechanism includes an engaging member and at least one adjusting member. The engaging member is slidably disposed in an inner space of one of the slide covers. The adjusting member is connected to the engaging member, and configured to make the engaging member slide in the inner space of the slide cover such that at least one portion of the engaging member extends outside the side cover.

According to one embodiment of the present disclosure, an inner surface of each of the aforementioned side covers has a track slot, an end of the adjusting member passes through the track slot and is connected to the engaging member disposed in the side cover, and the other end of the adjusting member extends outside the inner surface.

According to one embodiment of the present disclosure, the inner surface of each of the aforementioned side covers has a track slot, the adjusting member is a recessed structure disposed on the engaging member, the recessed structure is configured to let an external tool pass through the track slot and be inserted, such that the engaging member is driven to implement a slide motion.

According to one embodiment of the present disclosure, resisting members are disposed respectively at places near relative two ends of the aforementioned track slot, and the resisting members are configured to limit a moving path of the engaging member.

According to one embodiment of the present disclosure, the aforementioned adjusting member further includes an elastic member, the elastic member is accommodated in the inner space, and an end of the elastic member touches an inner wall of the side cover, another end of the elastic member is connected to an end of the engaging member. When the engaging member is at a retrieved position, the engaging member abuts against an end of the elastic member, another end of the elastic member abuts against the inner wall of the side cover, and the elastic member is compressed by the engaging member and is in the compressed situation.

According to one embodiment of the present disclosure, when the aforementioned elastic member is decompressed, one end of the engaging member is pushed outside the inner space of the side cover by the elastic member.

According to one embodiment of the present disclosure, the aforementioned engaging member further includes a fixing member, and the fixing member passes through the side cover, so as to limit the engaging member.

According to one embodiment of the present disclosure, each of the aforementioned side covers is an arc-shaped side cover, and the engaging member is a flexible sheet structure.

According to the aforementioned objectives of the present disclosure, a lamp system is provided. The lamp system includes at least two aforementioned lamp connected to each other. The inner spaces of the side covers of one of the lamps are connected to the inner spaces of the side covers of the adjacent lamp. When the lamps are in a connection state, the engaging member of one of the lamps slides in the inner space of one of the side covers of the adjacent lamp through the adjusting member.

According to the aforementioned objectives of the present disclosure, a method for assembling lamp system is provided, in which the method for assembling includes the following steps. At least two aforementioned lamps are provided. One of the lamps and the adjacent lamp are connected to each other, and the inner spaces of the side covers of one of the lamps are connected to the inner spaces of the side covers of the adjacent lamp. When the lamps are in a connection state, the adjusting member is used to make a portion of the engaging member of one of the lamps slide into the inner space of one of the side covers of the adjacent lamp.

According to the aforementioned objectives of the present disclosure, before connecting one of the lamps and the adjacent lamp to each other, the method for assembling further includes using the adjusting member to adjust the engaging member, so as to accommodate the engaging member in the side cover completely.

According to the aforementioned objectives of the present disclosure, a method for disassembling lamp system is provided, in which the method for disassembling includes the following steps. A lamp system is provided, in which the lamp system includes at least two aforementioned lamps, and in which a portion of the engaging member of one of the lamps is inserted into the inner spaces of the side covers of the adjacent lamp. The engaging member is adjusted through the adjusting member of the lamp required to be disassembled, so as to retract the engaging member from the inner space of the side cover of the adjacent lamp. The lamp required to be disassembled is removed.

According to the aforementioned embodiment of the present disclosure, the lamp of the present disclosure mainly uses the frame and the connecting mechanism design adjustable from outside to simplify the entire structure of the lamp. Through the connecting mechanism design adjustable from outside, in the process of connecting the lamps in series (or disassembling the lamps), the engaging member can be accommodated in the frame of the lamp completely in advance, so as to provide an installing method for easier assembling (or easier disassembling) to the operator in various situation such that installing or disassembling the last lamp in the closed lamp system, or the terminal lamp of the series lamp system near the wall, or taking out the middle lamp of the series lamp system to replace and fix.

BRIEF DESCRIPTION OF THE DRAWINGS

For a more fully understanding of embodiments and their advantages, reference is now made to the following description taken in conjunction with the accompanying figures, in which.

DETAILED DESCRIPTION

Figure 1:
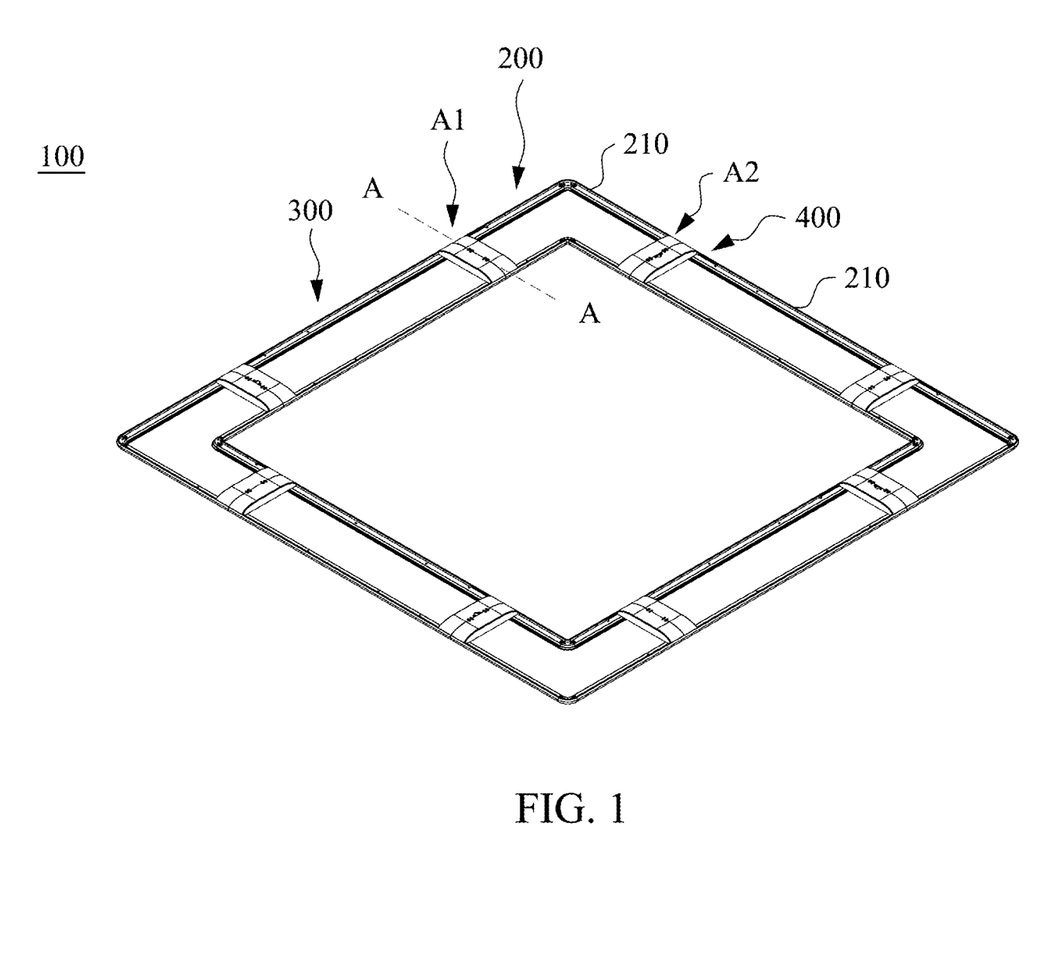
FIG. 1 illustrates a schematic diagram of a lamp system in accordance with an embodiment of the present disclosure.
Figure 2A:
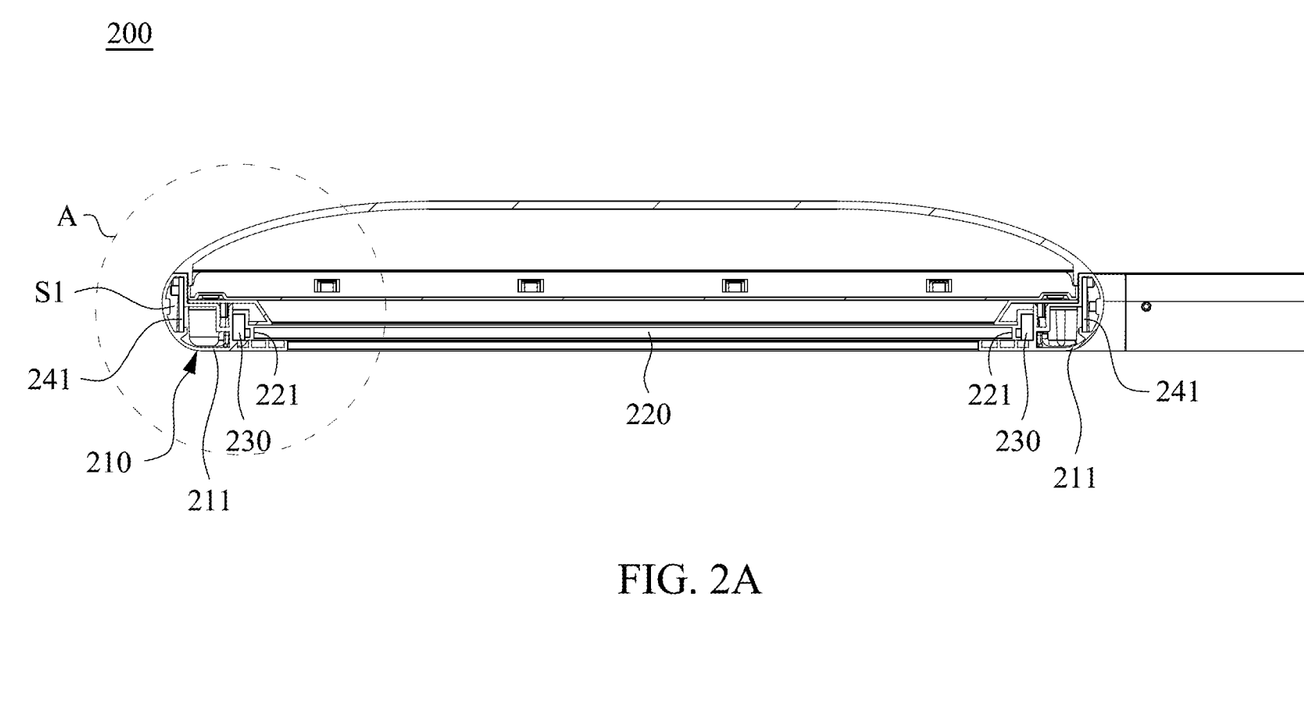
FIG. 2A illustrates a cross-sectional view taken along a line A-A of FIG. 1.
Figure 2B:
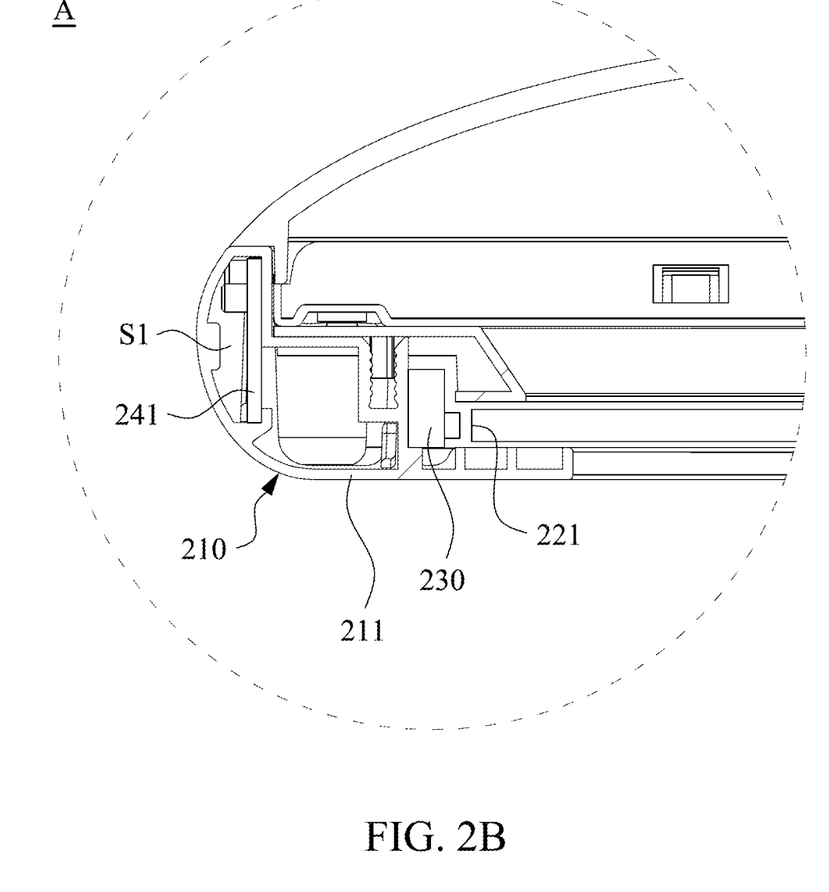
FIG. 2B illustrates an enlarged view of part A in FIG. 2A.

Referring to the figures from FIG. 1 to FIG. 2B simultaneously, FIG. 1 illustrates a schematic diagram of a lamp system in accordance with an embodiment of the present disclosure, FIG. 2A illustrates a cross-sectional view taken along a line A-A of FIG. 1, FIG. 2B illustrates an enlarged view of part A in FIG. 2A. A lamp system 100 of the present embodiment is mainly formed by connecting at least two lamps (for example, a lamp 200 and a lamp 300) to each other in series. In the embodiment of FIG. 1, the lamp system 100 of FIG. 1 includes the lamp 200, the lamp 300, and a lamp 400 as an exemplary example. The lamp 200 is an L-shaped lamp, the lamp 300 and the lamp 400 are rectangular lamps, and through connecting four lamps 200, two lamps 300 and two lamps 400 in series, the closed lamp system 100 can be formed. A structure of the lamp 300 is substantially the same as a structure of the lamp 400, and a difference between the lamp 200 and the lamp 300 is only a shape of a frame, and an internal structure and a function are substantially the same, hence in the following context the same elements are denoted as the same symbols.

Figure 3A:
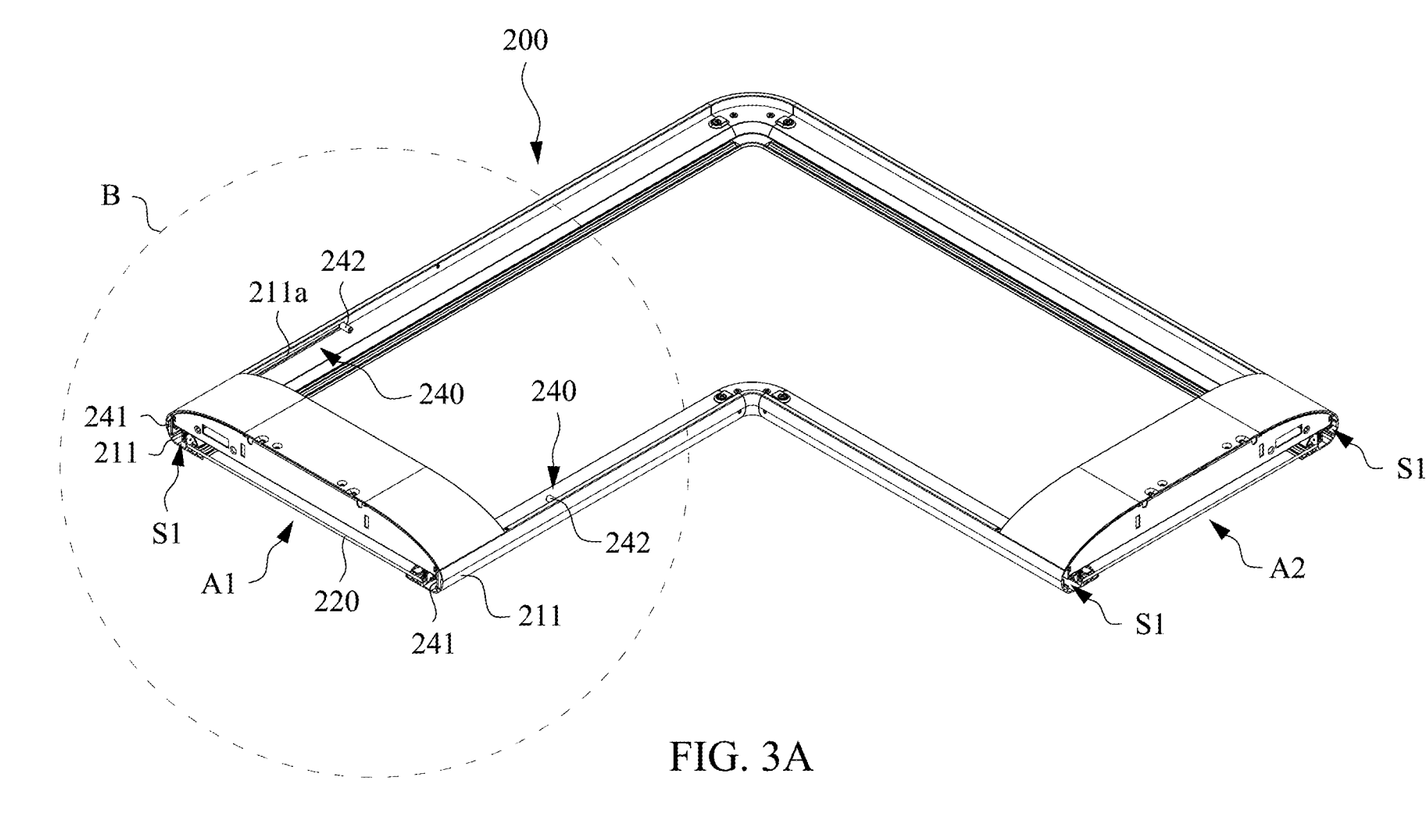
FIG. 3A illustrates a schematic diagram of a lamp in accordance with an embodiment of the present disclosure.
Figure 3B:
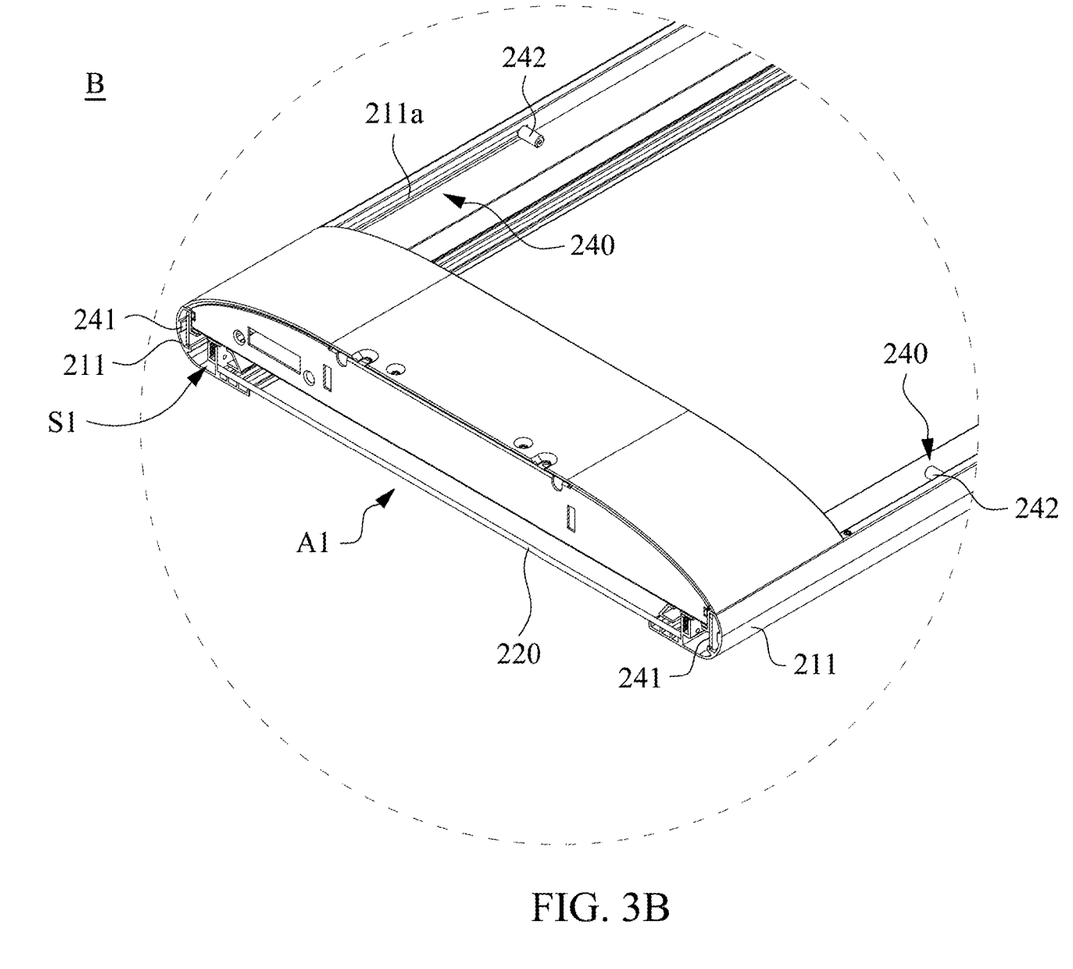
FIG. 3B illustrates an enlarged view of part B in FIG. 3A.
Figure 4:
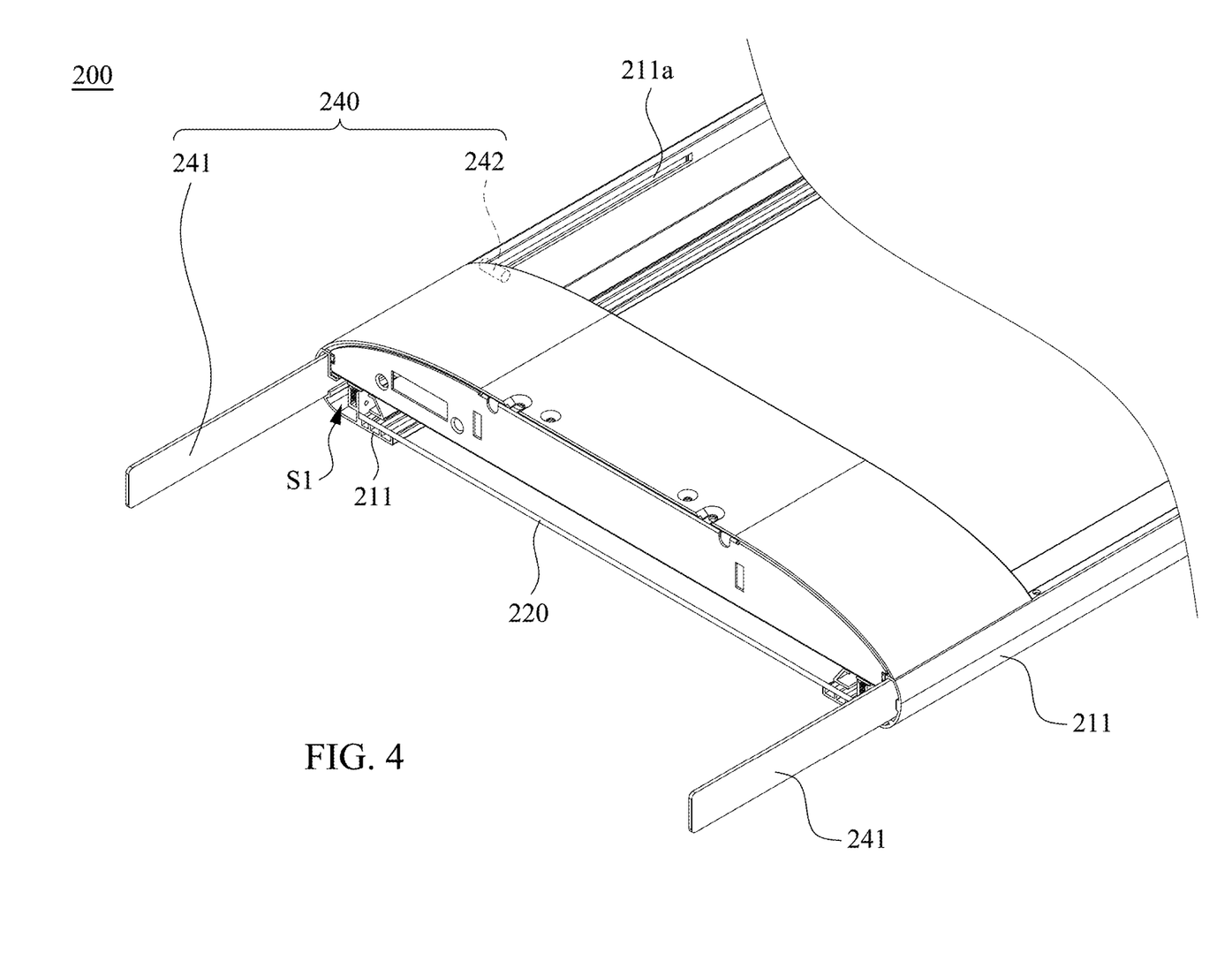
FIG. 4 illustrates a schematic diagram of an using state of a connecting mechanism of a lamp in accordance with an embodiment of the present disclosure.

Referring to FIG. 2A to FIG. 4 simultaneously, FIG. 3A illustrates a schematic diagram of a lamp in accordance with an embodiment of the present disclosure, FIG. 3B illustrates an enlarged view of part B in FIG. 3A, and FIG. 4 illustrates a schematic diagram of an using state of a connecting mechanism of a lamp in accordance with an embodiment of the present disclosure. The lamp 200 includes a frame 210, a light guide plate 220, at least one light source 230, and a connecting mechanism 240. The frame 210 includes two side covers 211 opposite to each other, in which two side covers 211 are approximately disposed in parallel, and an accommodating space is formed between the side covers. The light guide plate 220 is disposed in the accommodating space. Specifically speaking, a part of the light guide plate 220 near two relative side surfaces 221 is accommodated in the side covers 211. In the present embodiment, the number of the light sources 230 is two, and the light sources 230 are disposed respectively in two opposite side covers 211 and are adjacent to the side surfaces 221 of the light guide plate 220, therefore light provided from the light sources 230 enters into the light guide plate 220 from the side surfaces 221 of the light guide plate 220, and is emitted from a part of the surface of the light guide plate 220 not covered by the side covers 211.

As shown in the figures from FIG. 2A to FIG. 4, the connecting mechanisms 240 are disposed in the frame 210. In the present embodiment, the number of the connecting mechanisms 240 is two, and the connecting mechanisms 240 are disposed respectively on two side covers 211 opposite to each other. In the embodiment, the connecting mechanisms 240 of the lamp 200 is mainly used to connect the adjacent lamps, for example the lamp 300 and the lamp 400 as shown in FIG. 1. Specifically speaking, the connecting mechanism 240 includes an engaging member 241 and an adjusting member 242. The engaging member 241 is slidably disposed in an inner space S1 of the side cover 211. The adjusting member 242 is connected to the engaging member 241, and is configured to drive the engaging member 241 to slide in the inner space S1 of the side cover 211, so as to make at least a portion of the engaging member 241 to extend outside of the side cover 211.

As shown in FIG. 3A and FIG. 4, an inner surface of the side cover 211 has a track slot 211a, and the track slot 211a extends from the inner surface of the side cover 211 to the inner space S1 of the side cover 211. In an embodiment, the engaging member 241 is a board, and the adjusting member 242 is a convex pillar. An end of the adjusting member 242 passes through the track slot 211a and is connected to the engaging member 241 disposed in the side covers 211, and another end of the adjusting member 242 extends from the inner surface of the side cover 211. Therefore, an operator can operate the adjusting member 242 from the inner side of the side cover 211 to make the adjusting member 242 slide along the track slot 211a, and further control the engaging member 241 to slide in the side cover 211. In the present embodiment, the lamp has a first end A1 and a second end A2 opposite to each other, the connecting mechanism 240 is disposed at the first end A1 and the connecting mechanism 240 is not disposed at the second end A2. Therefore, the lamp 200 is connected to an end of the lamp 300 at the first end A1 through the connecting mechanism 240, and the second end A2 of the lamp 200 is used to connect to the connecting mechanism 240 of the lamp 400 at a side of the second end A2 of the lamp 200.

Figure 5:
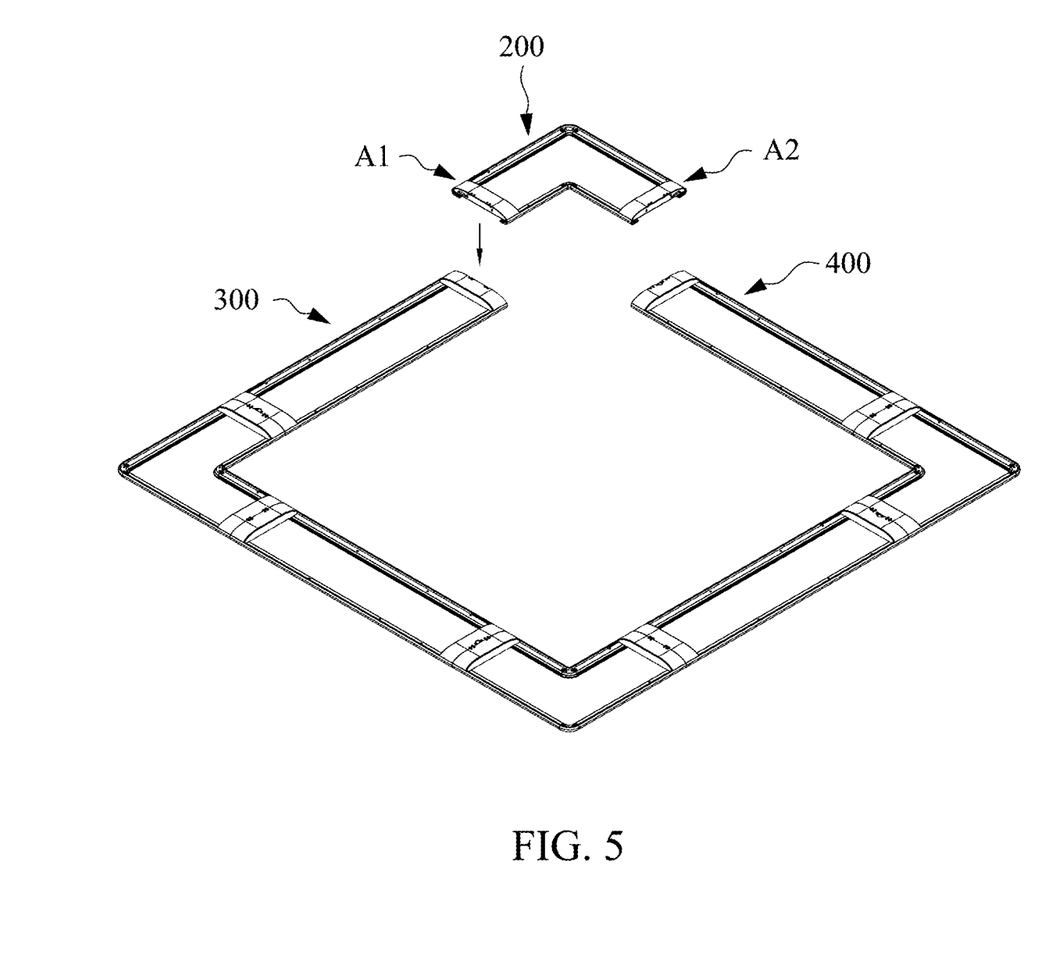
FIG. 5 illustrates a schematic diagram of an assembling process of a lamp system in accordance with an embodiment of the present disclosure.
Figure 6:
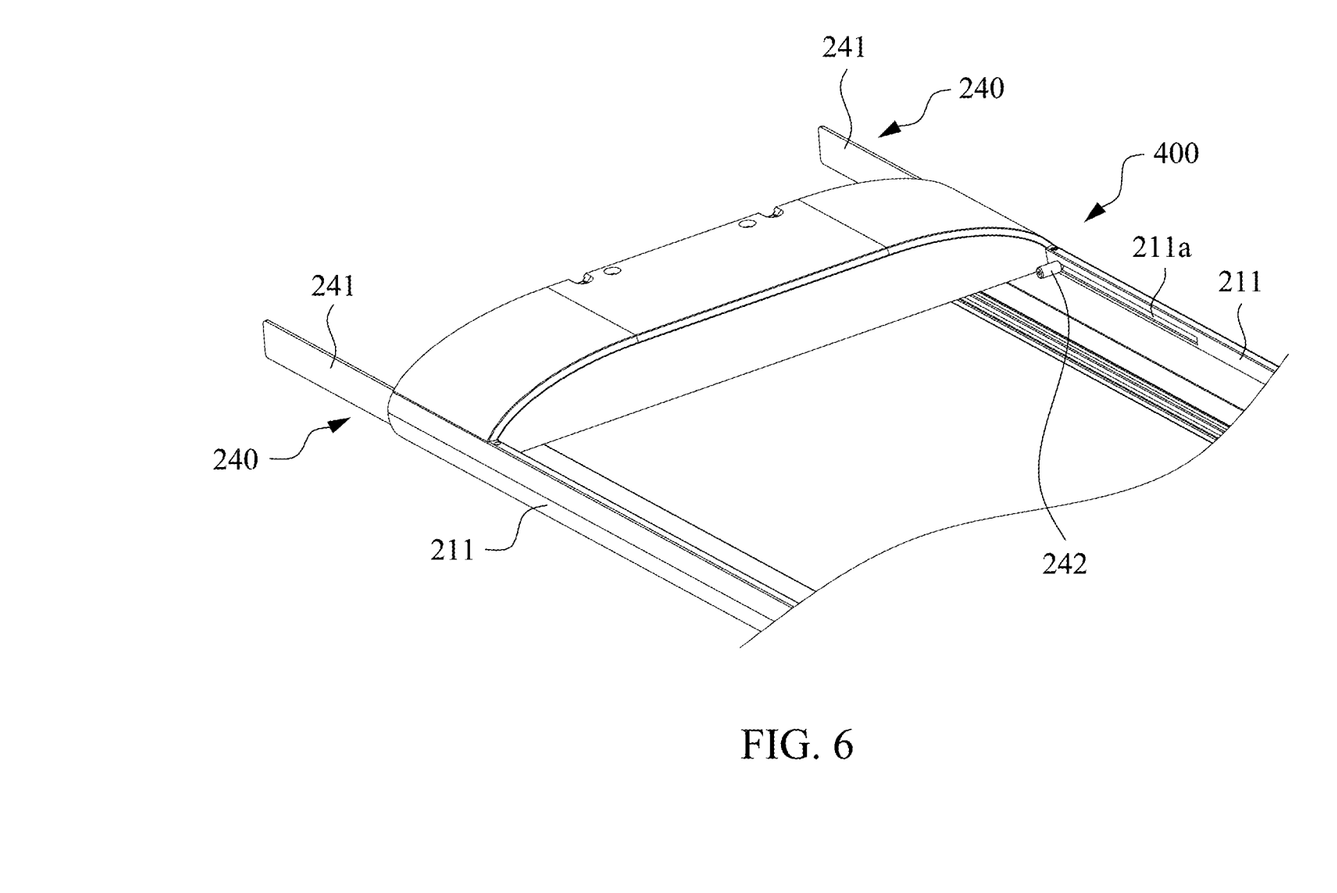
FIG. 6 illustrates a schematic diagram of another lamp in accordance with an embodiment of the present disclosure.

According to the aforementioned description, a method for assembling lamp system of the present disclosure is provided. Referring to FIG. 4 to FIG. 6, FIG. 5 illustrates a schematic diagram of an assembling process of a lamp system in accordance with an embodiment of the present disclosure, and FIG. 6 illustrates a schematic diagram of another lamp in accordance with an embodiment of the present disclosure. The method for assembling mainly includes the following steps. First of all, at least two aforementioned lamps are provided, and one of the aforementioned two lamps includes the engaging member 241. As shown in FIG. 5, FIG. 5 takes the lamps 200, the lamps 300, and the lamps 400 as an example, the engaging member 241 of the lamp 200 is accommodated in the inner space S1 near the first end A1, and the engaging member 241 of the lamp 400 is accommodated in the inner space S1 toward the second end A2 of the lamp 200. Next, the lamp 200 is engaged with the lamp 300 at the first end A1 of the lamp 200, and the inner space S1 of the side cover 211 of the lamp 200 is connected to the inner space S1 of the side cover 211 of the lamp 300 at the first end A1 of the lamp 200. In the example of FIG. 5, when engaging the lamp 200 with the lamp 300, the lamp 200 also engages with the lamp 400 at the second end A2 at the same time, and the inner space S1 of the side cover 211 of the lamp 200 is connected to the inner space S1 of the side cover 211 of the lamp 400. When the first end A1 of the lamp 200 is connected to the lamp 300 and the second end A2 of the lamp 200 is connected to the lamp 400, the adjusting member 242 of the lamp 200 is used to make a portion of the engaging member 241 slide into the inner space S1 of the side cover of the lamp 300, and the adjusting member 242 of the lamp 400 is used to make a portion of the engaging member 241 slide into the inner space S1 of the side cover 211 of the lamp 200, so as to connect the first end A1 of the lamp 200 to the lamp 300 in series and connect the second end A2 of the lamp 200 to the lamp 400 in series.

In the aforementioned method for assembling, before connecting the lamp 200, the lamp 300, and the lamp 400 to each other, the adjusting member 242 of the lamp 200 is used to adjust the engaging member 241, so as to accommodate the engaging member 241 in the side cover 211 completely. Identically, the adjusting member 242 of the lamp 400 is used to adjust the engaging member 241, so as to accommodate the engaging member 241 in the side cover 211 completely and dispose the lamp 200 between the lamp 300 and the lamp 400 in any direction. After connecting the first end A1 of the lamp 200 to the lamp 300 in series and connecting the second end A2 of the lamp 200 to the lamp 400 in series, a portion of the engaging member 241 of the lamp 200 has been inserted into the side cover 211 of the lamp 300, and a portion of the engaging member 241 of the lamp 200 is in the side cover 211 of the lamp 200; identically, a portion of the engaging member 241 of the lamp 400 has been inserted into the side cover 211 of the lamp 200, and a portion of the engaging member 241 of the lamp 400 is in the side cover 211 of the lamp 200.

Accordingly, the present disclosure provides another method for disassembling lamp system. Referring to FIG. 1 to FIG. 6, the method for disassembling mainly includes the following steps. First of all, the lamp system 100 as shown in the FIG. 1 is provided. Next, before disassembling the lamp 200, the engaging member 241 is adjusted through the adjusting member 242 of the lamp 200 in advance, and the engaging member 241 is made to retract from the side cover 211 of the lamp 300 to the inner space S1 of the side cover 211 of the lamp 200 completely. Identically, the engaging member 241 is adjusted through the adjusting member 242 of the lamp 400, and the engaging member 241 is made to retract from the side cover 211 of the lamp 200 to the inner space S1 of the side cover 211 of the lamp 400 completely. Next, the lamp 200 is disassembled. Therefore, regardless of the connecting process in series of the lamp 200 or the disassembling process of the lamp 200, the position of the adjacent lamp 300 or the position of the adjacent lamp 400 do not need to be moved, hence whether the lamp is at a corner or at the position near wall, it is easy to connected in series and disassembled.

Figure 7:
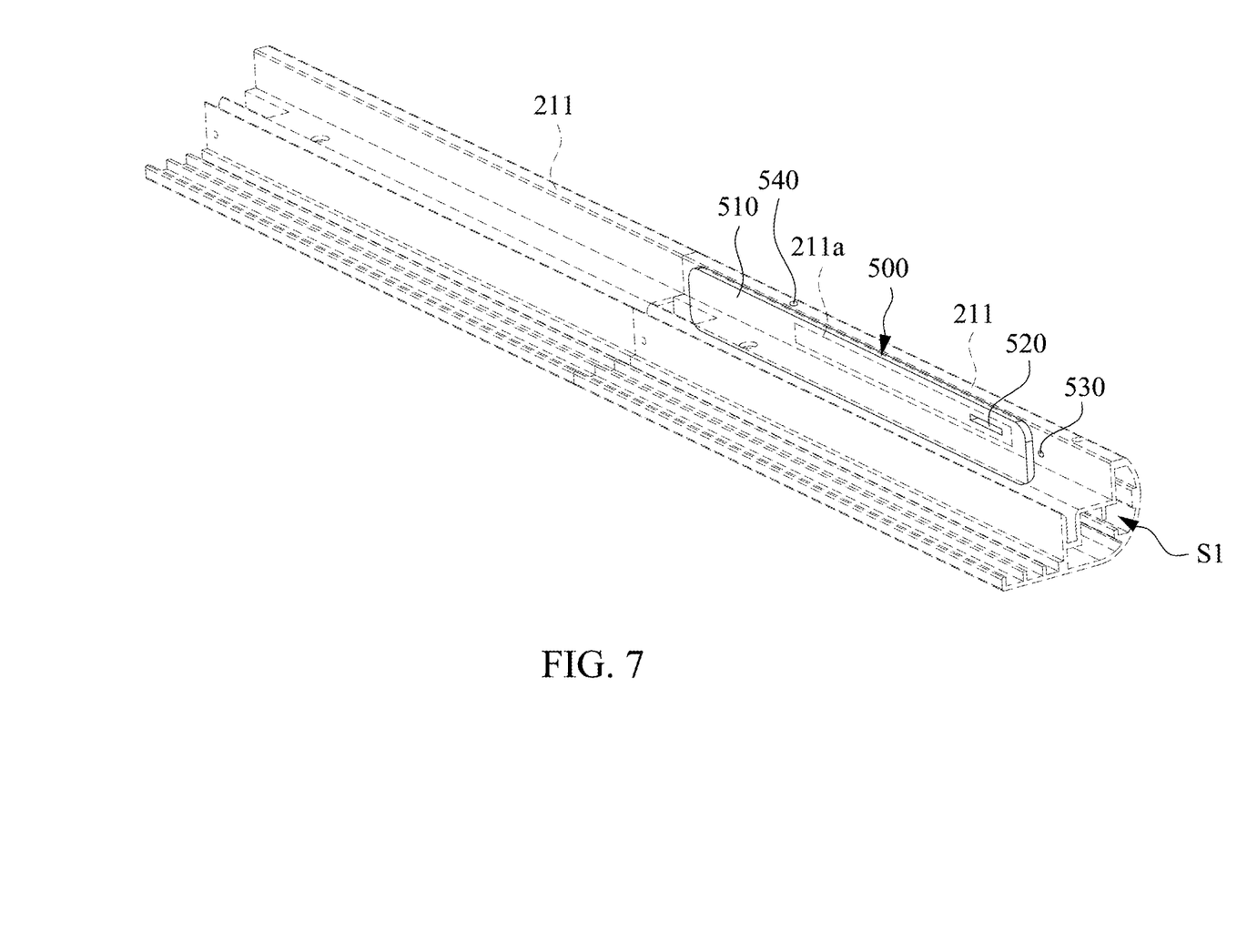
FIG. 7 illustrates a schematic diagram of another connecting mechanism in accordance with an embodiment of the present disclosure.
Figure 8:
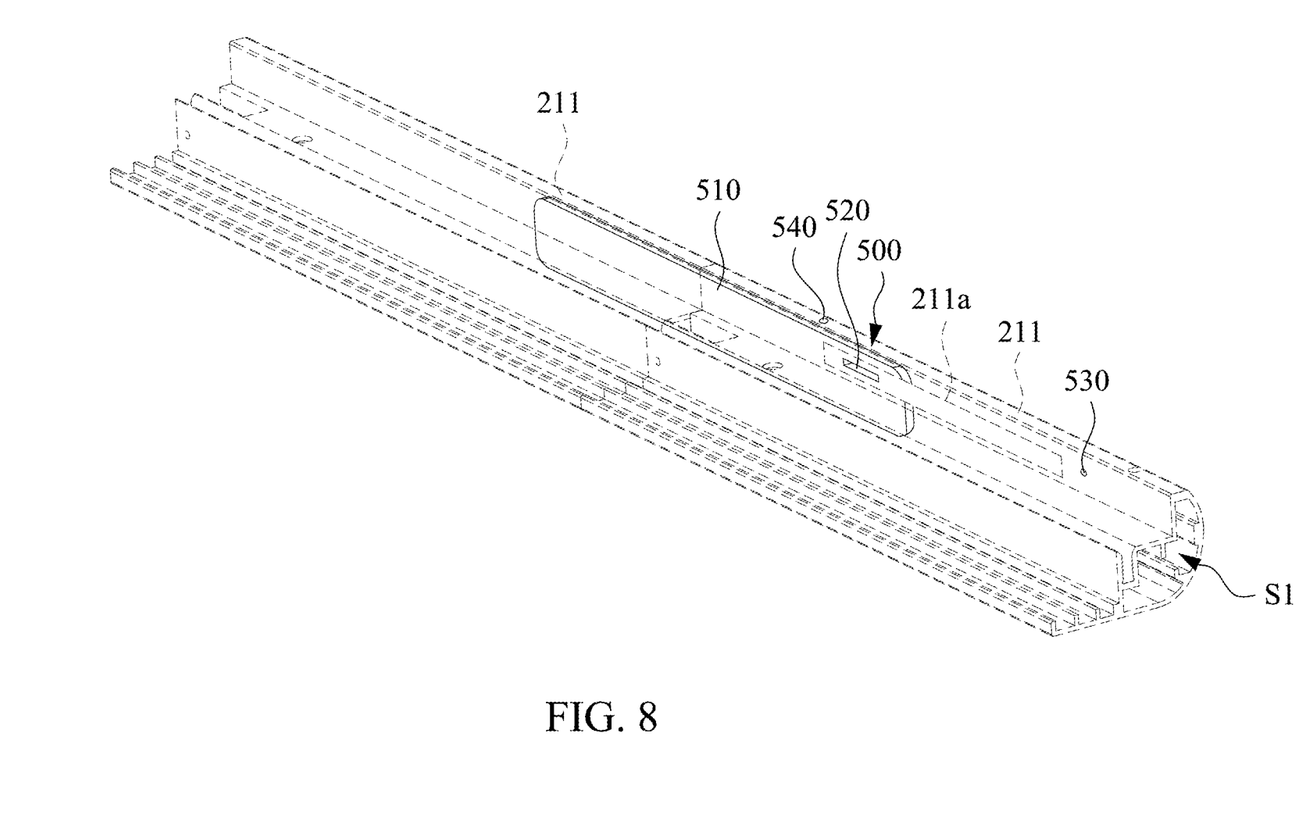
FIG. 8 illustrates a schematic diagram of an using state of another connecting mechanism of a lamp in accordance with an embodiment of the present disclosure.

In the present disclosure, the connecting mechanism can have different design. Referring to FIG. 7 and FIG. 8, FIG. 7 illustrates a schematic diagram of another connecting mechanism in accordance with an embodiment of the present disclosure, and FIG. 8 illustrates a schematic diagram of a using state of another connecting mechanism of a lamp in accordance with an embodiment of the present disclosure. The connecting mechanism 500 of the present disclosure identically includes an engaging member 510 and an adjusting member 520. The engaging member is slidably disposed in the inner space S1. The engaging member 510 is a board, and the adjusting member 520 is a recessed structure disposed on the engaging member 510. Therefore, external tools (for example, a flathead screwdriver) can pass the track slot 211a and be inserted into the recessed structure, so as to make the engaging member 510 slide in the inner space S1 of the side cover 211 and make at least a portion of the extend into the side cover 211 of the adjacent lamp such that the adjacent lamps are connected in series.

As shown in FIG. 7 and FIG. 8, in the present disclosure, a resisting member 530 and a resisting member 540 are respectively disposed at positions near relative two ends of the track slot 211a, and the resisting member 530 and the resisting member 540 are configured to limit moving paths of the engaging member. In an example, the resisting member 530 can be for example socket set screws locked into the side cover 211 from the side surface of the side cover 211. The resisting member 540 can be for example socket set screws locked into the side cover 211 from the top surface of the side cover 211. When the engaging member 510 is moved to a required position, the socket set screws can be locked into the top surface of the engaging member 510, thereby limiting the moving of the engaging member 510.

Figure 9:
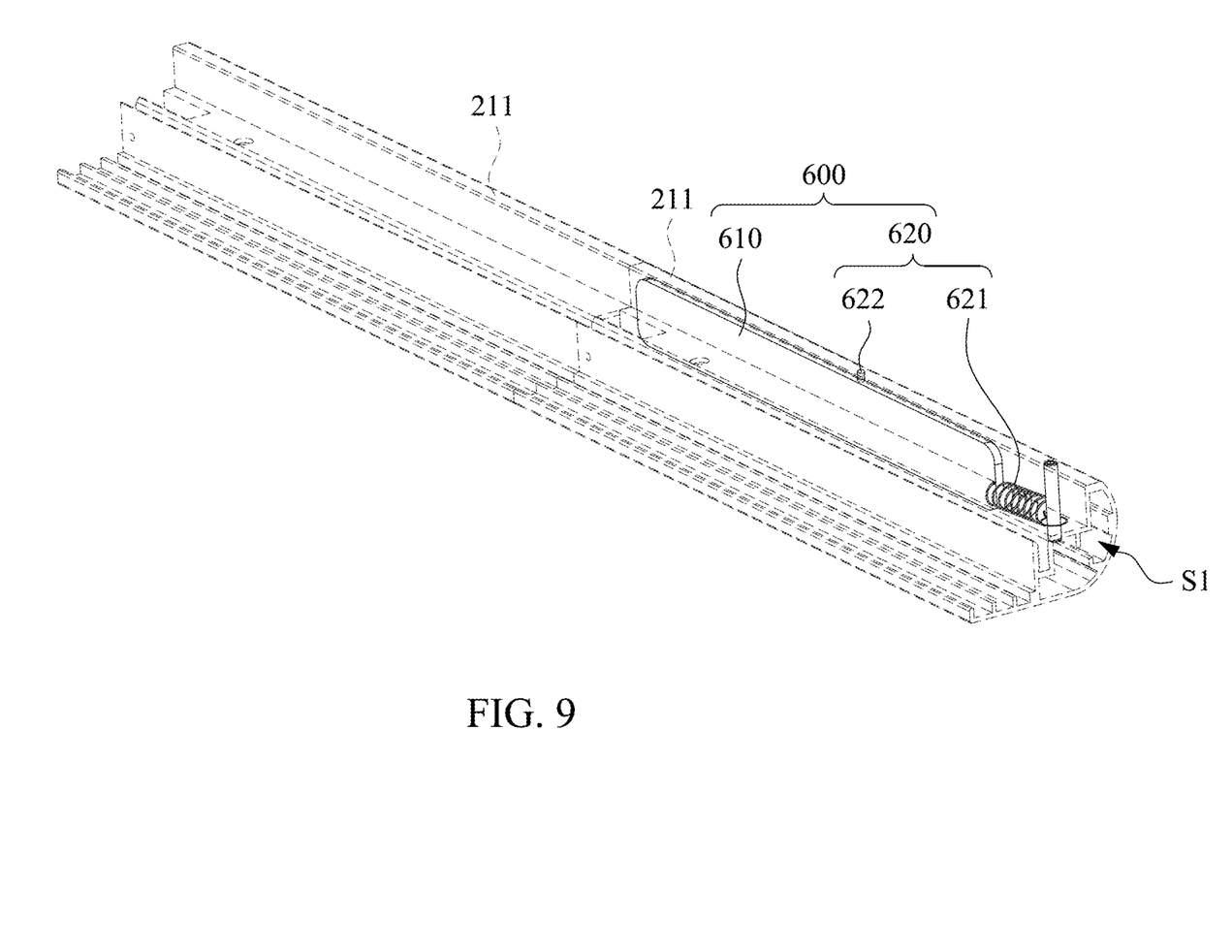
FIG. 9 illustrates a schematic diagram of one another connecting mechanism in accordance with an embodiment of the present disclosure.
Figure 10:
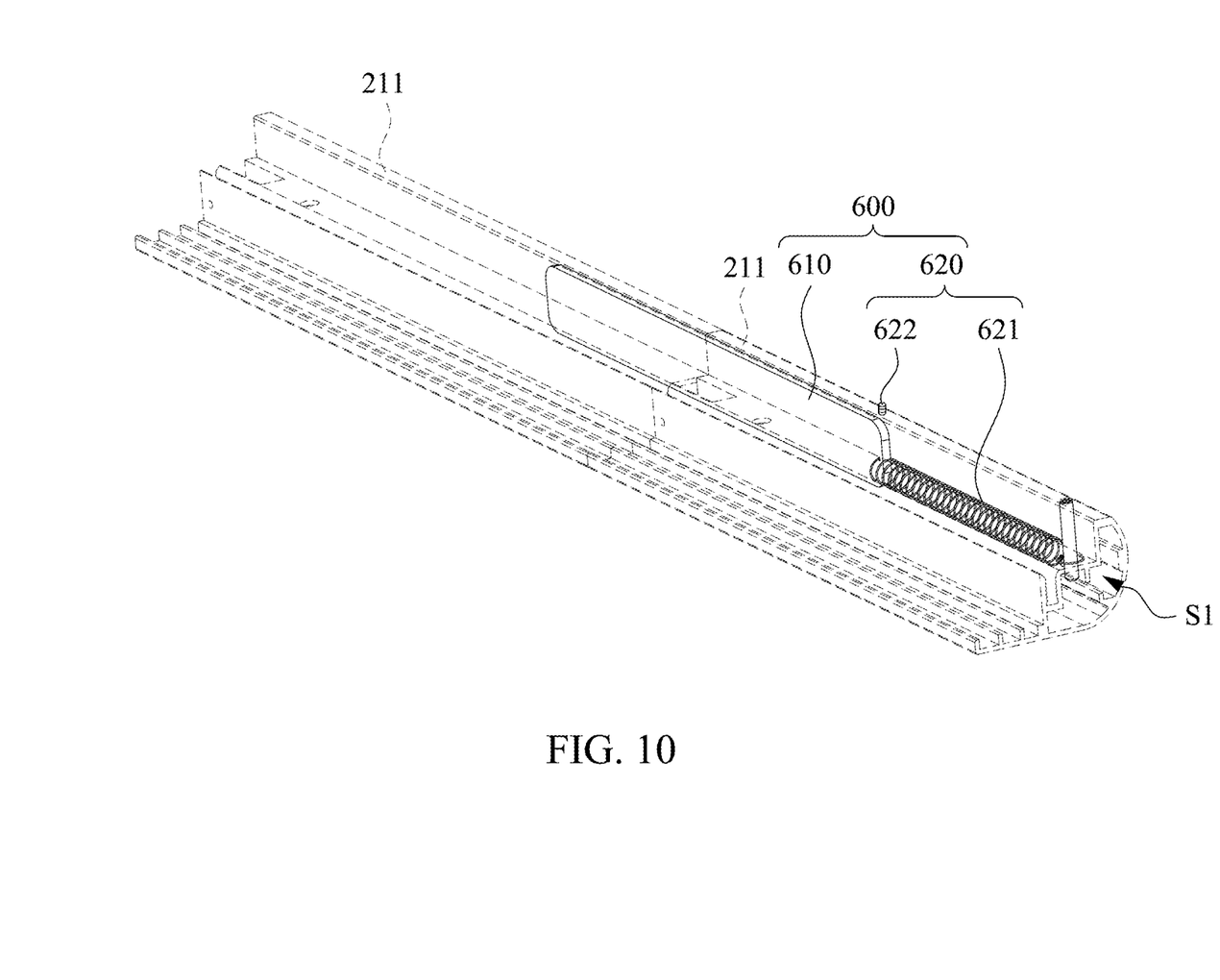
FIG. 10 illustrates a schematic diagram of an using state of one another connecting mechanism of a lamp in accordance with an embodiment of the present disclosure.

Referring to FIG. 9 and FIG. 10, FIG. 9 illustrates a schematic diagram of one another connecting mechanism in accordance with an embodiment of the present disclosure, and FIG. 10 illustrates a schematic diagram of a using state of one another connecting mechanism of a lamp in accordance with an embodiment of the present disclosure. The connecting mechanism 600 of the present embodiment identically includes an engaging member 610 and an adjusting member 620. The engaging member 610 is slidably disposed in the inner space S1 of the side cover 211. The engaging member 610 is a board, and the adjusting member 620 includes an elastic member 621 and a fixing member 622. The elastic member 621 is accommodated in the inner space S1, an end of the elastic member 621 contacts or abuts against the inner wall of the side cover 211, and another end is connected to one end of the engaging member 610. As shown in FIG. 9, when the engaging member 610 is at the retrieved position, the elastic member 621 is accommodated in one inner space S1 of the side cover 211 so as to be compressed, and the engaging member 610 abuts against an end of the elastic member 621, another end of the elastic member 621 abuts against the inner wall of the side cover 211. The engaging member 610 is limited by the pressing of the fixing member 622 penetrating from the top surface of the side cover 211, and the elastic member 621 is compressed by the engaging member 610 and in the compressed status. As shown in FIG. 10, when the fixing member 622 is loosened from pressing and the engaging member 610 is not limited by the fixing member 622, the engaging member 610 is exerted by the elastic force from the elastic member 621 and is pushed into the side cover 211 of the adjacent lamp, hence at least a portion of the engaging member 610 is inserted into the side cover 211 of the adjacent lamp, so as to connect two adjacent lamps to each other in series. At the same time, the elastic member 621 can stay in a bigger space which formed by two inner space S1 of the two adjacent side cover 211. In the present embodiment, the side cover 211 can also has a track slot 211a as shown in FIG. 7 and FIG. 8, and the recessed structure corresponding to the track slot 211a as shown in FIG. 7 and FIG. 8 is correspondingly disposed on the engaging member 610 for using external tools (for example, flathead screwdrivers) conveniently to pass the track slot 211a and be inserted into the recessed structure, so as to implement the aforementioned disassembling method of lamp.

Figure 11:
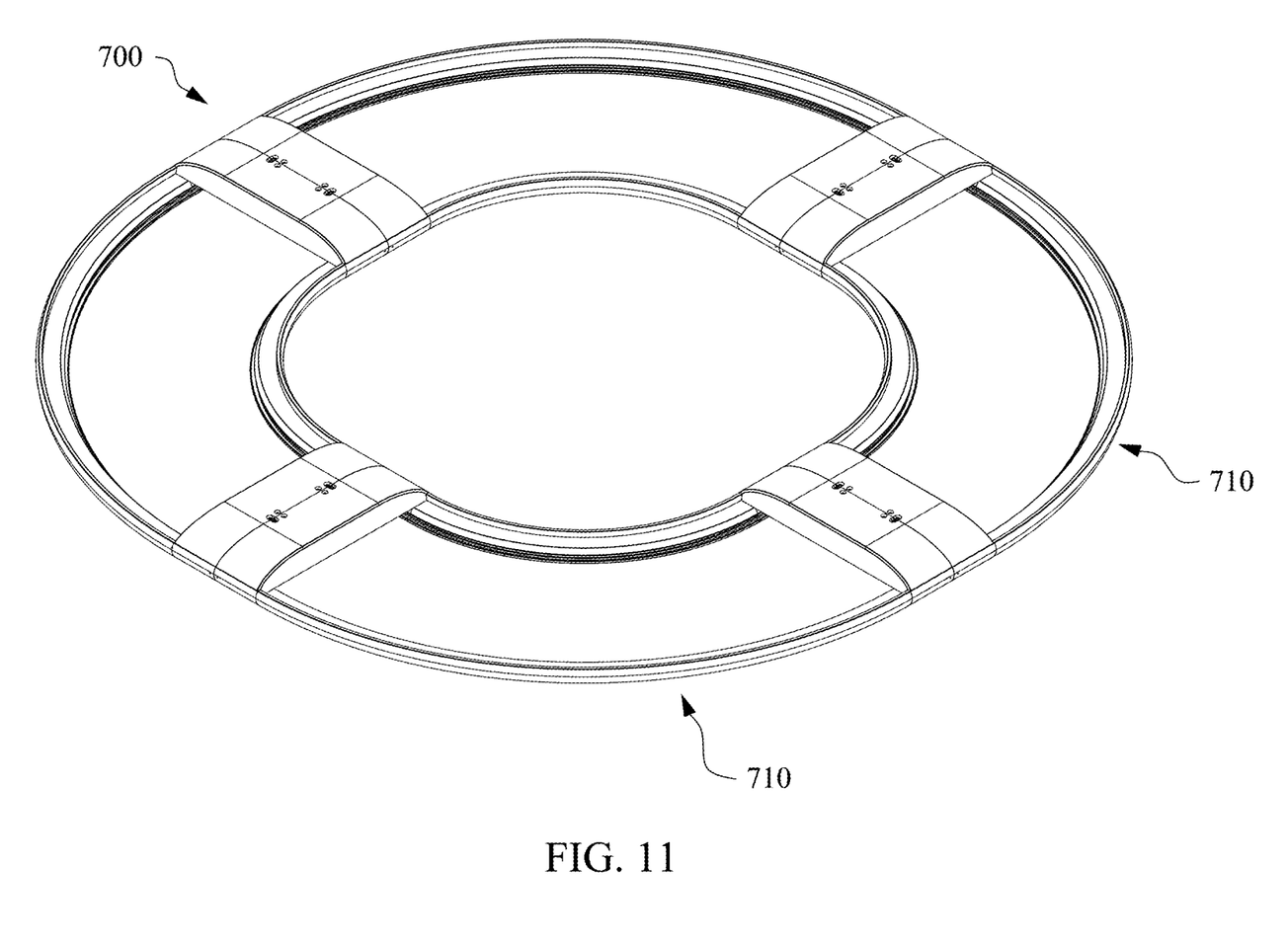
FIG. 11 illustrates a schematic diagram of a lamp system in accordance with an embodiment of the present disclosure.

In some embodiments, the series shape of the lamp system is not limited to be like the rectangle as shown in FIG. 1. Referring to FIG. 11, FIG. 11 illustrates a schematic diagram of a lamp system in accordance with an embodiment of the present disclosure. In the present embodiment, a lamp system 700 is formed by connecting four arc-shaped lamps 700 to each other in series. An internal structure of the arc-shaped lamp 710 is substantially the same as the internal structure of the aforementioned lamp 200, the only difference is that the side cover of the frame of the lamp 710 is an arc-shaped side cover. To cooperate this design, the aforementioned engaging member of the connecting mechanism is a flexible sheet structure, for example, a plastic elastic sheet, so as to slide in the arc-shaped slide cover.

According to the aforementioned embodiment of the present disclosure, the lamp of the present disclosure mainly uses the frame and the connecting mechanism design adjustable from outside to simplify the entire structure of the lamp. Through the connecting mechanism design adjustable from outside, in the process of connecting the lamps in series (or disassembling the lamps), the engaging member can be accommodated in the frame of the lamp completely in advance, so as to provide an installing method for easier assembling (or easier disassembling) to the operator in various situation such that installing or disassembling the last lamp in the closed lamp system, or the terminal lamp of the series lamp system near the wall, or taking out the middle lamp of the series lamp system to replace and fix.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. A lamp comprising:
    a frame comprising two opposite side covers, and the side covers enclosing an accommodating space collectively;
    a light guide plate disposed in the accommodating space;
    at least one light source disposed in at least one of the side covers, and the light source being disposed near an incident surface of the light guide plate; and
    a connecting mechanism disposed in the frame, wherein the connecting mechanism comprises:
        an engaging member slidably disposed in an inner space of one of the side covers;
        an elastic member accommodated in the inner space, an end of the elastic member abutting against an inner wall of the side cover, and another end of the elastic member connected to an end of the engaging member; and
        at least one adjusting member connected to the engaging member, and configured to make the engaging member slide in the inner space of the side cover such that at least one portion of the engaging member extends outside the side cover;
    wherein the engaging member is slid along a direction of movement, the elastic member has a direction of an elastic force, and the direction of movement and the direction of the elastic force are the same.

2. The lamp of claim 1, wherein an inner surface of each of the side covers has a track slot, an end of the adjusting member passes through the track slot and is connected to the engaging member disposed in the side cover, and the other end of the engaging member extends outside the inner surface.

3. The lamp of claim 1, wherein an inner surface of each of the side covers has a track slot, the adjusting member is a recessed structure disposed on the engaging member, and the recessed structure is configured to let an external tool pass through the track slot and be inserted, such that the engaging member is driven to implement a slide motion.

4. The lamp of claim 3, wherein resisting members are disposed respectively at places near relative two ends of the track slot, and the resisting members are configured to limit a moving path of the engaging member.

5. The lamp of claim 1, wherein
    when the engaging member is at a closed position, the engaging member touches the another end of the elastic member, the end of the elastic member touches the inner wall of the side cover, and the elastic member is compressed by the engaging member and is in the compressed situation.

6. The lamp of claim 5, wherein when the engaging member is at a configured position, and another end of the engaging member pushed outside the inner space of the side cover by the elastic member.

7. The lamp of claim 5, wherein the engaging member further comprises a fixing member, and the fixing member passes through the side cover, so as to limit the engaging member.

8. The lamp of claim 1, wherein each of the side covers is an arc-shaped side cover, and the engaging member is a flexible sheet structure.

9. A lamp system comprising:
    at least two lamps of claim 1 connected to each other;
    wherein the inner spaces of the side covers of one of the lamps are connected to the inner spaces of the side covers of the adjacent lamp; and wherein when the lamps are in a connection state, the engaging member of one of the lamps slides in the inner space of one of the side covers of the adjacent lamp through the adjusting member.

10. A method for assembling lamp system, comprising:
providing at least two lamps of claim 1;
connecting one of the lamps and the adjacent lamp to each other, and connecting the inner spaces of the side covers of one of the lamps to the inner spaces of the side covers of the adjacent lamp; and
when the lamps are in a connection state, using the adjusting member to make a portion of the engaging member of one of the lamps slide into the inner space of one of the side covers of the adjacent lamp.

11. The method for assembling of claim 10, before connecting one of the lamps and the adjacent lamp to each other, the method for assembling further comprising using the adjusting member to adjust the engaging member, so as to accommodate the engaging member in the side cover completely.

12. A method for disassembling lamp system, comprising:
providing a lamp system, wherein the lamp system comprises at least two lamps of claim 1, and wherein a portion of the engaging member of one of the lamps is inserted into the inner spaces of the side covers of the adjacent lamp;
adjusting the engaging member through the adjusting member of the lamp required to be disassembled, so as to retract the engaging member from the inner space of the side cover of the adjacent lamp; and
removing the lamp required to be disassembled.

* * * * *